(12) United States Patent
Asencio et al.

(10) Patent No.: US 12,561,237 B2
(45) Date of Patent: Feb. 24, 2026

(54) MAPPING APPLICATIONS TO COMPUTING ENVIRONMENTS

(71) Applicant: Wells Fargo Bank, N.A., San Francisco, CA (US)

(72) Inventors: Jose Asencio, Charlotte, NC (US); Ryan Atkins, San Francisco, CA (US); Paulo Ayala, O'Fallon, MO (US); Jones Devlin, St. Louis, MO (US); Daniel Schmitz, O'Fallon, IL (US); William Stimson, Maryville, IL (US); Jesse Updegraff, St. Louis, MO (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 254 days.

(21) Appl. No.: 18/361,416

(22) Filed: Jul. 28, 2023

(65) Prior Publication Data
US 2025/0036560 A1     Jan. 30, 2025

(51) Int. Cl.
  *G06F 11/3698*     (2025.01)
  *G06F 9/54*     (2006.01)
(52) U.S. Cl.
  CPC .......... *G06F 11/3698* (2025.01); *G06F 9/547* (2013.01)
(58) Field of Classification Search
  None
  See application file for complete search history.

(56) References Cited

U.S. PATENT DOCUMENTS

| | | | |
|---|---|---|---|
| 9,842,045 B2 | 12/2017 | Heorhiadi et al. | |
| 10,552,293 B2* | 2/2020 | Rajasekar | G06F 11/3466 |
| 11,256,604 B2 | 2/2022 | Agarwal et al. | |
| 11,347,622 B1 | 5/2022 | Agarwal et al. | |
| 11,416,380 B2 | 8/2022 | Gefen et al. | |
| 2009/0089761 A1* | 4/2009 | Lazzaro | G06F 11/3698 |
| | | | 717/128 |
| 2012/0265726 A1* | 10/2012 | Padmanabhan | G06F 16/214 |
| | | | 707/602 |
| 2013/0346980 A1* | 12/2013 | Branch | G06F 11/3428 |
| | | | 718/100 |
| 2015/0212853 A1* | 7/2015 | Makino | G06F 9/5038 |
| | | | 718/103 |
| 2016/0092339 A1* | 3/2016 | Straub | G06F 9/44521 |
| | | | 717/124 |
| 2017/0075792 A1* | 3/2017 | Udvuleanu | G06F 11/3636 |
| 2017/0111257 A1* | 4/2017 | Nozawa | H04L 41/069 |
| 2018/0088935 A1 | 3/2018 | Church et al. | |

(Continued)

OTHER PUBLICATIONS

Gazzola et al., "Automatic Ex-Vivo Regression Testing of Microservices," 2020 IEEE/ACM 1st International Conference on Automation of Software Test (AST) (pp. 11-20) (2020).

(Continued)

*Primary Examiner* — Ryan D. Coyer
(74) *Attorney, Agent, or Firm* — Merchant & Gould P.C.

(57)     ABSTRACT

Mapping a message sent between computing applications to a computing environment associated with one of the computing applications. The computing environment can be a test environment used for developing the computing application. Identification of the computing environment and other data from the message can be extracted from a header of the message and logged. The logged data can be stored in a storage and displayed via a user interface.

20 Claims, 8 Drawing Sheets

(56)　　　　　　References Cited

U.S. PATENT DOCUMENTS

| 2018/0309637 | A1 | 10/2018 | Gill et al. |
| 2019/0163610 | A1* | 5/2019 | Vent .................... G06F 11/3698 |
| 2020/0236187 | A1* | 7/2020 | Tal ..................... H04L 63/0281 |
| 2020/0259715 | A1 | 8/2020 | Schermann et al. |
| 2020/0306970 | A1* | 10/2020 | Latkar ................ G06F 11/0766 |
| 2021/0157710 | A1 | 5/2021 | Alexander |
| 2021/0334384 | A1 | 10/2021 | Ranjan et al. |
| 2022/0091916 | A1 | 3/2022 | Liu et al. |
| 2022/0245131 | A1 | 8/2022 | Loeb |
| 2022/0398187 | A1 | 12/2022 | Balasubramanian et al. |

OTHER PUBLICATIONS

Zhou et al., "Latent Error Prediction and Fault Localization for Microservice Applications by Learning from System Trace Logs," ESEC/FSE '19, Tallinn, Estonia (12 pgs) (Aug. 2019).
Zhang et al., "DeepTraLog: Trace-Log Combined Microservice Anomaly Detection through Graph-based Deep Learning," 2022 IEEE/ACM 44th International Conference on Software Engineering (ICSE), ICSE '22, Pittsburgh, PA, USA (12 pgs.) (May 2022).

* cited by examiner

Figure 3:
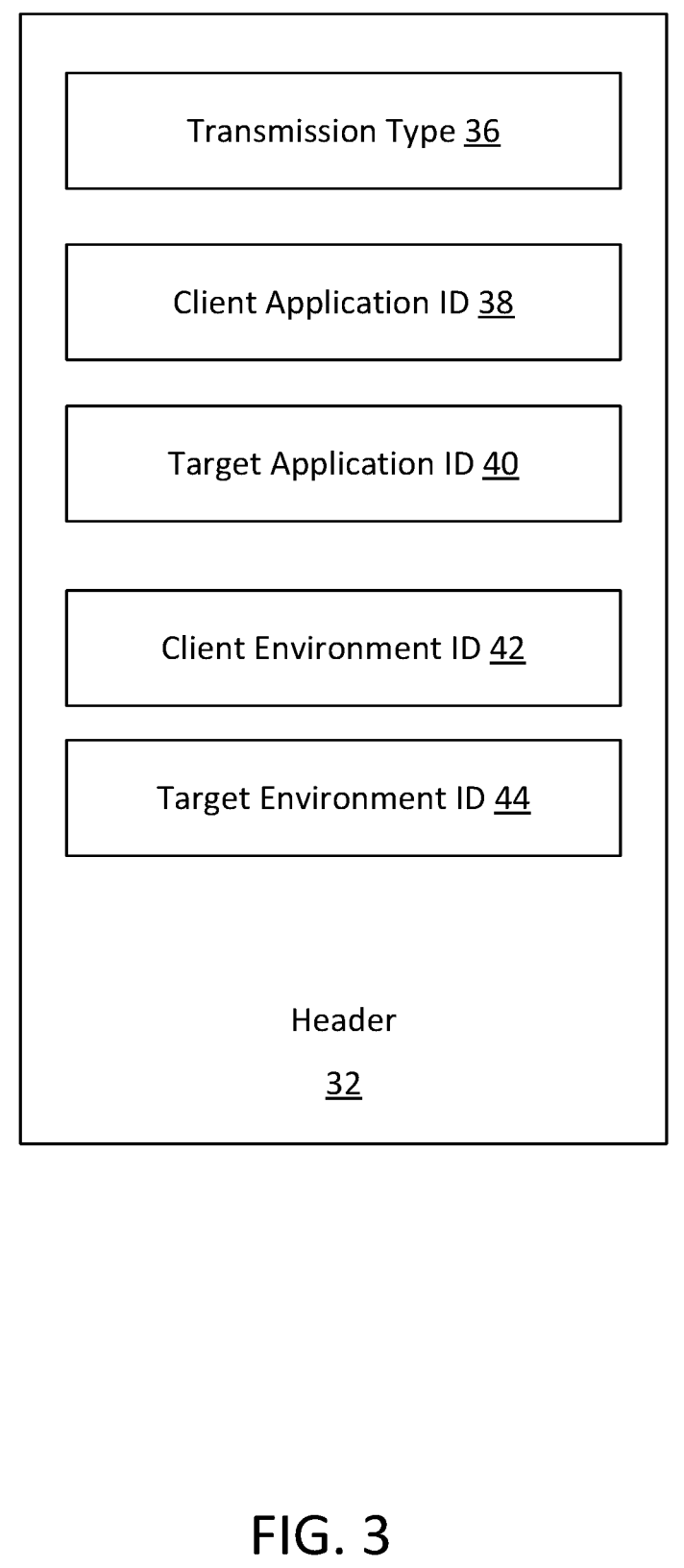

Transmission Type <u>36</u>

Client Application ID <u>38</u>

Target Application ID <u>40</u>

Client Environment ID <u>42</u>

Target Environment ID <u>44</u>

Header

| Time | DataTxType | ClientAppID | TargetAppID | Payload | ClientEnvID | TargetEnvID |
|------|-----------|-------------|-------------|---------|-------------|-------------|
| TimeStamp1 | Request | eTraderA | PayTransfer | ReqCont1 | DEV | DEV |
| TimeStamp2 | Response | eTraderA | PayTransfer | RespCont2 | DEV | DEV |
| TimeStamp3 | Request | eTraderB | PayTransfer | ReqCont3 | DEV | ALPHATEST |
| ... | ... | ... | ... | ... | ... | ... |
| TimeStampN | Request | ElectricCo | PayTransfer | RespContN | DEV | BETATEST |

80

90

92
Receive request and response messages

94
Extract data from the messages, including a computing environment ID

96
Store the extracted data in a message log

98
Generate a user interface displaying the log

MAPPING APPLICATIONS TO COMPUTING ENVIRONMENTS

BACKGROUND

Client applications interface through application program interfaces with backend applications. The client application and the backend applications can operate across different computing environments. Developers of the client applications and/or the backend applications use test computing environments to simulate running of the client applications prior to deployment of the client applications and backend applications and to troubleshoot issues after deployment of the client applications and backend applications.

SUMMARY

Embodiments of the disclosure are directed to mapping a computing application to a computing environment.

Embodiments of the disclosure are directed to mapping a data transmission to or from a client computing application to a computing environment in which a backend target computing application is operating.

Embodiments of the disclosure are directed to logging a map of a computing application to a computing environment.

Embodiments of the disclosure are directed to a graphical user interface that displays a mapping of a client computing application to a backend target computing environment.

Embodiments of the disclosure are directed to using a logged map of a client application to a backend computing environment to generate and execute a test for the client application and/or backend target application.

According to certain aspects, a method for mapping a client computing application to a computing environment, includes: receiving a data transmission between the client computing application and a target computing application, the target computing application operating across a plurality of computing environments; determining, from the data transmission, that the data transmission was sent to the target computing application operating in a target environment of the plurality of computing environments; and storing, in a computer-readable storage, a log of the data transmission, the log including an indicator of the target computing environment.

According to further aspects, a system for mapping a client computing application to a computing environment, includes: at least one processor; and non-transitory computer-readable storage having stored thereon instructions which, when executed by the at least one processor, cause the at least one processor to: receive a data transmission between the client computing application and a target computing application, the target computing application operating across a plurality of computing environments determine, from the data transmission, that the data transmission was sent to the target computing application operating in a target environment of the plurality of computing environments; and store, in a computer-readable storage, a log of the data transmission, the log including an indicator of the target computing environment.

According to further aspects, a method for mapping a client computing application to a computing environment includes: receiving messages, the messages including a request message, sent by a client computing application via an Application Program Interface (API) gateway to a target computing application; and a response message, in response to the request message, sent by the target computing application via the API gateway to the client computing application; extracting data from each message of the messages, the data including: a data transmission type indicator indicating whether the message is a request message or a response message; a client computing application identifier identifying the client computing application; a target computing application identifier identifying the target computing application; a payload; a first computing environment identifier identifying a client computing environment in which the client computing application was operating when processing the message; and a second computing environment identifier identifying a target computing environment in which the target computing application was operating when processing the message; logging the data to generate logged data; and generating a user interface that displays a log of the logged data.

The details of one or more techniques are set forth in the accompanying drawings and the description below. Other features, objects, and advantages of these techniques will be apparent from the description, drawings, and claims.

DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 3 illustrates components of the data transmission of FIG. 2.

DETAILED DESCRIPTION

Figure 1:
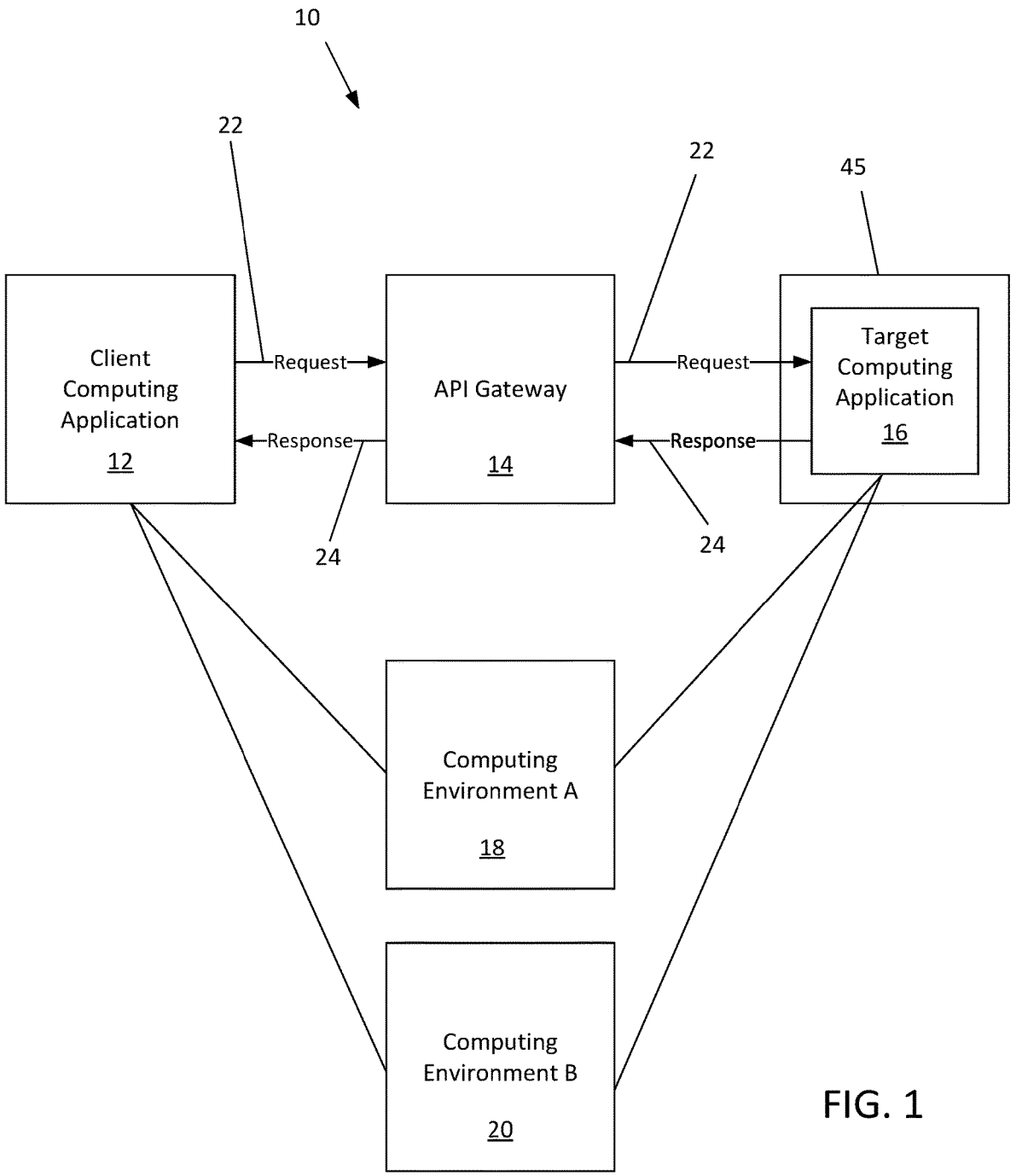
FIG. 1 illustrates an example system for mapping a computing application to a computing environment.

The present disclosure relates to mapping messages from or to one computing application from or to a computing environment of another computing application that is operating across multiple computing environments.

For example, one of the computing applications can be dependent on the other computing application.

Enterprises, such as financial institutions that offer financial products and services (e.g., credit cards, loans, mortgages, investment services, bank accounts etc.), typically operate across multiple computing environments to develop, test and deploy products and services. Many such products and services are made available to users (e.g., customers) via computing applications.

For example, users can download a client computing application to their own computing device (e.g., a client device, such as a smart phone, a smart wearable device, a tablet, a laptop computer, a desktop computer, and so forth). The client computing application can be created and/or run by the financial institution or by a third party. The client computing application interfaces, via an application program interface (API), with a backend (e.g., a target) computing application run by the financial institution.

According to an example use case, a financial institution may develop a backend (e.g., target) computing application to interface with various electronic brokerage type client computing applications that users can download to their own client devices. For instance, such a brokerage type client computing application can be configured to buy, sell and trade investments. The brokerage type client computing application interfaces (via an API) with the financial institution's backend application so that the financial information associated with a user and monetary funds of the user managed by the financial institution can be accessed by the electronic brokerage application to provide its products and services to the client.

Continuing with the example use case, the financial institution initiates a project to develop the backend computing application and/or the client computing application. The project can operate across multiple computing environments that are used for different aspects of the product's development (e.g., for initial deployment of the product) and management (e.g., to fix defects in an already deployed product). Such computing environments can include, for example a pre-testing development computing environment, an alpha testing computing environment, a beta testing computing environment, a preproduction computing environment and a production computing environment.

Each environment supports different aspects of developing, testing, and/or fixing the product. Each computing environment can be associated with its own dedicated hardware (e.g., databases), metadata, and software, its own environment-dedicated product development personnel or team of personnel, and its own set of stored and accessed data.

Different client applications may be mapped inconsistently to computing environments (e.g., test computing environments) of an enterprise on which the client application depend. This can often occur, for example, where the client computing application utilizes shared microservices, such as cloud-based microservices, to function. The microservices may be provided by a third party (e.g., an entity other than the financial institution) but, in the context of a particular client computing application, those microservices may depend on the backend target application of the financial institution.

Depending on the shared microservices that are operating with the client computing application, data transmissions (e.g., messages) may be routed to different backend computing environments in which the target computing application is operating. Returning to the previous use case, for example, two different client computing brokerage apps may rely on the same backend target computing application to complete user requests (e.g., to make trades or investments), but route their user requests to different backend target environments.

Due to inconsistencies in routing between dependent client applications and backend computing environments, the different client application can receive back, in response to their requests, different data. In the context of testing the client computing application and the target computing application, these inconsistencies can be problematic. For example, because different test environments may respond with different data it may be unclear if a potential issue that has been flagged by testing or development team is the result of a bug (e.g., a defect in one or both of the client computing application and the backend computing applications) or simply an innocuous data inconsistency caused by different responses being generated by different backend test computing environments.

The inconsistent routing of data transmissions (e.g., requests and responses) between client computing application and backend target application may prevent application development and testing teams from efficiently testing both new development and defect fixes.

Such inconsistent mapping may also lengthen resolution time and increase the risk of either not completely fixing a defect in the client computing application and/or the target backend application, if there is a defect, or even introducing a new defect to the client computing application and/or the target backend application as a result of not understanding or not appreciating that the issue was only a data discrepancy due to the particular backend computing environment to which the data transmission was routed.

Advantageously, aspects of the present disclosure improve accessibility to how data transmissions are routed between one computing application and another computing application that is operating across different computing environments.

One example improvement made possible by aspects of the present disclosure is extraction of a target computing environment from a data transmission between two computing applications via an API.

Another example improvement made possible by aspects of the present disclosure is a computing environment-specific visualization of data transmission mappings between computing applications.

Another example improvement made possible by aspects of the present disclosure is generation of test data transmissions (e.g., for purposes of testing a computing application) using computing environment specific mappings of prior data transmissions between computing applications.

Another example improvement made possible by aspects of the present disclosure is automated attribution of a data transmission discrepancy to processing of the data transmission by a particular test computing environment.

These example improvements result in one or more practical applications of the disclosed technology. Additional advantages and improvements will be apparent from the present disclosure.

FIG. 1 illustrates an example system 10 for mapping a computing application to a computing environment.

The system 10 includes a client computing application 12 and other system components 45 that include a target computing application 16. The other system components 45 are described in more detail below with reference to FIG. 4.

Each computing application 12, 16 operates in multiple computing environments, including, for example, computing environment A 18 and computing environment B 20 of the system 10. For instance, computing environments 18 and 20 can be pre-production product testing environments that are different from each other. For instance, computing environment 18 can be a testing environment for testing basic functionality of the client computing application 12 and/or the target computing application 16, while computing environment 20 can be a testing environment (e.g., a beta testing environment) for testing user experience with the application.

A user facing component of the client computing application 12 can be downloaded to a local computing device (e.g., a smart phone, a tablet, a wearable smart device, a laptop computer, a desktop computer, etc.) of a user (e.g., a customer of a financial institution).

In some examples, components of the client computing application 12 are configured as a microservice application. That is, via a network, the client computing application 12 is configured to operate using shared microservices (e.g., microservices provided by a third party computing cloud). Non-limiting examples of such microservices can include services that manage page layout of a user interface, services that generate messages and alerts, services that generate specific types of documents, and so forth. In other examples, the client computing application 12 is not reliant on third party microservices but is nevertheless dependent on the target computing application 16 in order to operate.

As mentioned, the client computing application 12 is dependent on the target computing application 16. For instance, the client computing application 12 may need to access a financial account via the target computing application 16 in order to perform a specific task, e.g., to complete a trade or an investment on behalf of a customer of the financial institution that is using the client computing application 12.

The target computing application 16 is a backend computing application, e.g., of the financial institution. For instance, the backend computing application 16 can provide the client computing application 12 access to and data from a financial institution customer's financial accounts managed by the financial institution.

At least a component of the target computing application 16 typically will reside in dedicated hardware of the financial institution.

In some examples, components of the target computing application 16 are configured as a microservice application. That is, via a network, the client computing application 12 is configured to operate using shared microservices (e.g., microservices provided by a third party computing cloud). In other examples, the target computing application 16 is not reliant on third party microservices in order to operate.

The client computing application 12 and the targeting computing application 16 communicate with each other to provide the user-facing functionality of the client computing application 12. These communications consist of requests 22 and responses 24.

Requests 22, in this context, are data transmissions. Data transmissions are data packets (e.g., messages) sent by the client computing application 12 and received by the target computing application 16 via an API gateway 14.

Responses 24, in this context, are data transmissions (e.g., data packets such as messages) sent by the target computing application 16 and received by the client computing application 12 via the API gateway. The responses 24 can be data transmissions that respond to the requests 22. For instance, a request 22 can be a request for permission to access a financial account of a customer of the financial institution, and the corresponding response 24 can be a granting or denial of the permission.

The API gateway 14 include an application program interface that enables the computing applications 12 and 16 to communicate with each other. In some examples, the API gateway 14 includes a proxy layer that hides underlying functionality of one of the computing applications 12 and 16 from the other. For example, if source code of the target computing application 16 is updated, the API gateway acts as a proxy for the target computing application 16 such that the software update does not significantly or noticeably modify the user experience of the client computing application 12.

The API gateway 14 provides a communication interface between the client computing application 12 and the target computing application 16 by generating a service call out from the client computing application 12 to the target computing application 16 for a request 22, and vice versa for a response 24. Example components of such a service call out will now be described with reference to FIG. 2.

Figure 2:
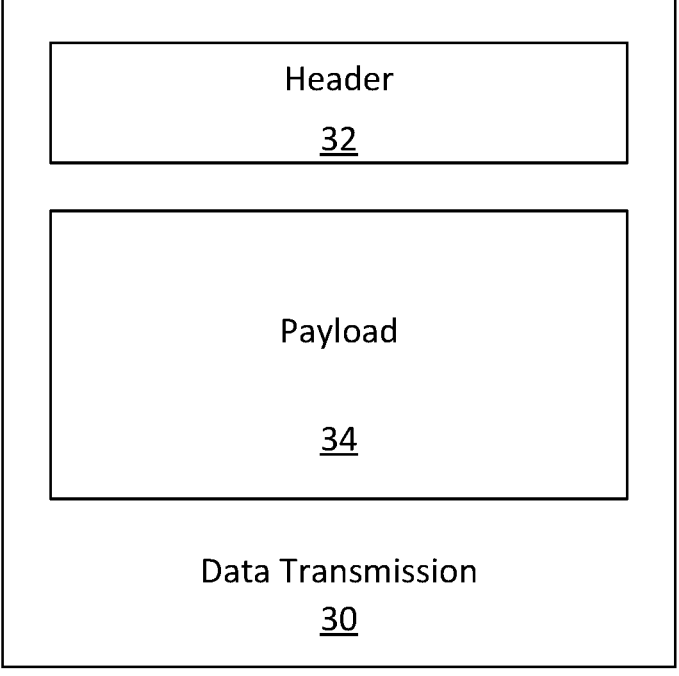
FIG. 2 illustrates a data transmission between computing applications of the system of FIG. 1.

FIG. 2 illustrates a data transmission 30 between computing applications of the system of FIG. 1. For example, referring to FIGS. 1 and 2, the data transmission 30 can correspond to a request 22 or a response 24 and configured as a service call out by the API gateway 14.

The data transmission 30 includes a header 32 and a payload 34. In some examples, the data transmission 30 is configured or formatted by the API gateway 14.

The payload 34 is the actual data content of the request or the response, e.g., a request for permission to access a financial account or a denial or granting of permission. Alternatively, the payload 34 is a data pointer to an accessible data storage location that stores the actual data content of the request or the response.

The header 32 includes metadata associated with the data transmission 30. Such metadata can include, for example, a time that the message was generated or received, an indicator of a computing environment in which one of the computing applications is operating or indicators of computing environments for each of the computing applications, the type of data transmission (e.g., a request or a response), an indicator identifying the client computing application, and/or an indicator identifying the target computing application. Other metadata providing information about other attributes of the data transmission 30 can be provided by the header 32.

FIG. 3 illustrates components of the data transmission 30 of FIG. 2. In particular, FIG. 3 illustrates non-limiting examples of metadata that can be carried by the header 32 of the data transmission 30 of FIG. 2.

Metadata carried by the header 32 can include, for example, the data transmission type 36 e.g., whether the data transmission is a request or a response.

Metadata carried by the header 32 can include, for example, an indicator 38 identifying the client computing application associated with the data transmission 30.

Metadata carried by the header 32 can include, for example, an indicator 40 identifying the target computing application associated with the data transmission 30.

Metadata carried by the header 32 can include, for example, an indicator 42 identifying the computing environment in which the client computing application is operating when processing the data transmission.

Metadata carried by the header 32 can also include, for example, an indicator 44 identifying the computing environment in which the target computing application is operating when processing the data transmission.

Other metadata providing information about other attributes of the data transmission 30 can be provided by the header 32.

Figure 4:
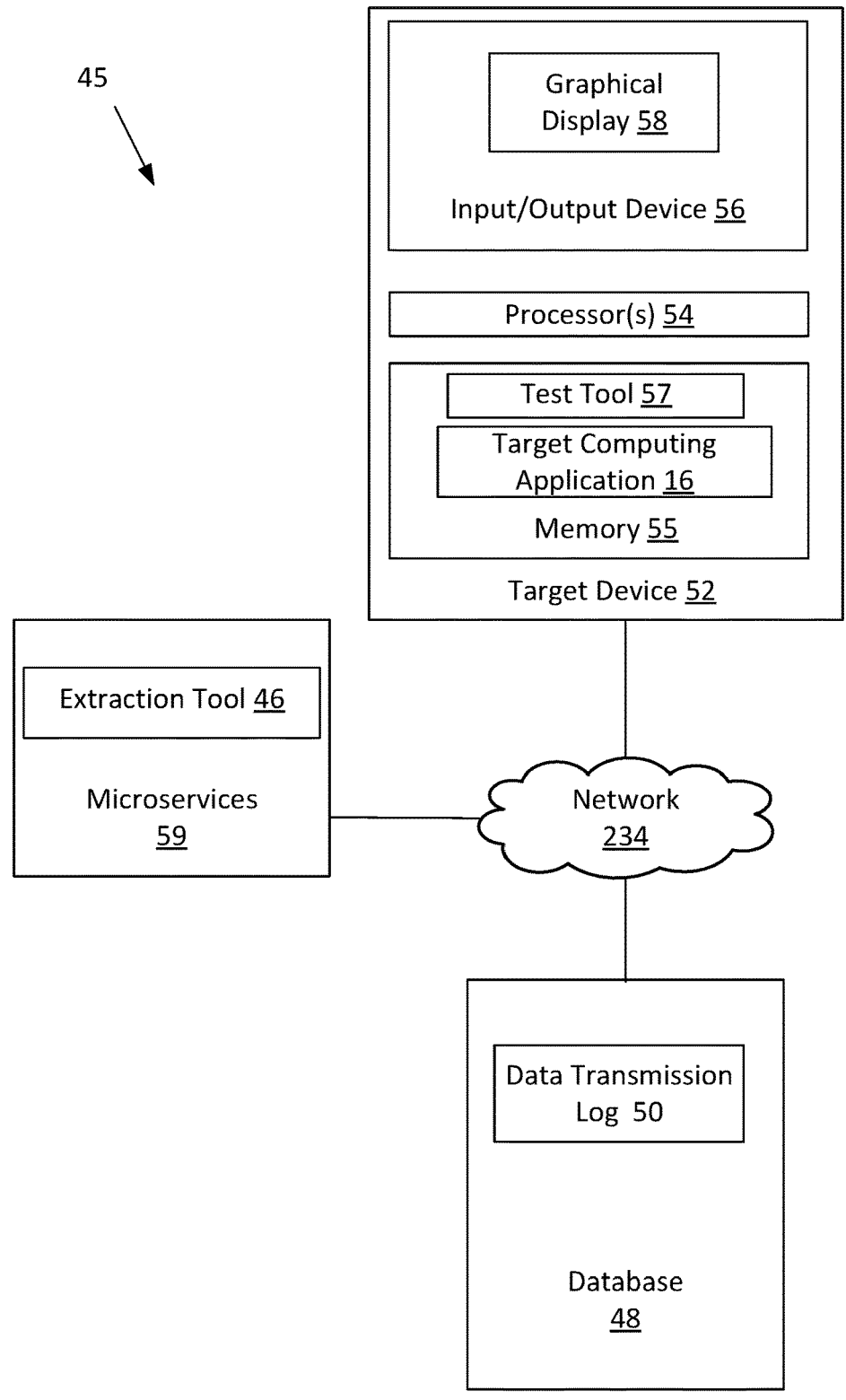
FIG. 4 illustrates additional components of the system of FIG. 1.

FIG. 4 illustrates the additional components 45 of the system of FIG. 1.

The components 45 include a target device 52. The target device 52 can be a backend device (e.g., a server) of the financial institution, or a server that the financial institution uses to perform various computing operations.

In some examples, all of the components of the target device 52 are incorporated in a single local device or terminal of a user, e.g., a stakeholder of a financial institution. In other examples, components of the target device 52 can be distributed among one or more local devices and/or one or more remote devices such as a server that communicates with the local device via the network 234. For instance, the memory 55 or a portion of the memory 55 can be stored on a server while the input/output (I/O) device 56 is a component of different device, e.g., a client terminal.

In examples that include a server, in some instances the server device can be a private server, e.g., of a financial institution or other enterprise. In other instances, the server can be a shared server, such as a cloud to which users of a given enterprise have selective, private access.

The following description of FIG. 4 assumes that the target device 52 is a single device, such as a local server of a financial institution.

The target device 52 is configured to generate, store and display mappings of computing applications to computing environments, such as a mapping from a client computing application to a target computing environment.

The target device 52 is also configured to test computing applications using test data transmissions generated from stored logs of prior data transmissions.

The target device 52 includes one or more processor(s) 54 configured to process data and execute computer readable instructions stored on the memory 55, for performing functions of the target device 52 described herein. For example, the processor(s) 54 can be configured to carry out functionality of the target computing application 16 and the extraction tool 46.

The memory 55 stores the target computing application 16, which is processed and executed by the processor(s) 54. User interfaces (e.g., graphical user interfaces) are generated using the target computing application 16 and displayed using the input/output (I/O) device 56, and particularly the graphical display 58 of the I/O device 56, which is configured to display a user interface generated by the target computing application 16. The I/O device 56 can also include, for example, one or more of a touch screen, a microphone, a speaker, a stylus, a pen, a mouse and so forth.

The memory 55 includes non-transitory computer-readable storage.

The target computing application 16 can be a microservices based application. That is, the computing application 16 can depend on one or more microservices 49 to operate fully. The microservices 59 can be provided by a third party, e.g., a third party cloud, for sharing with different computing applications. In other examples, the microservices 59 can be stored by the target device 52, e.g., in the memory 55.

The microservices 59 can include an extraction tool 46. The extraction tool 46 is configured to extract (e.g., scrape) data from a data transmission 30 (FIG. 2) and store the data in a log together with data of other data transmissions. In particular the log generated by the extraction tool 46 can be stored as a data transmission log 50 that is stored on a database 48.

The database 48 can be a portion of the memory 55 or remote therefrom.

The database 48, the microservices 49, and the target device 52 are in operative communication with one another via the network 234.

The extraction tool 46 can extract, e.g., payload data (e.g., the payload 34) and header data (e.g., metadata such as data from the header 32) from a data transmission (e.g., the data transmission 30) and cause that extracted data to populate a single log entry of the data transmission log 50 that is then stored on the database 48. Each data transmission (e.g., each message, such as a request or a response) between the client computing application and the target computing application via the API gateway is logged in its own log entry of the log 50 by the extraction tool 46.

Via the network 234, the target device 52 can retrieve data from the log 50 and generate a user interface on the graphical display 58 that shows mappings, generated from the log entries, of computing applications to computing environments of other applications.

Via the network 234, the target device 52 can also retrieve data from the log 50 to generate a test data transmission message based on the data and metadata of a logged data transmission. Such a test data transmission can be generated by a test tool 57 stored on the memory 55 of the target device 52. In another example, the test tool 57 can be one of the microservices 49.

The test data transmission generated by the test tool 57 advantageously mimics an actual data transmission. The test data transmission can be used in a testing session (e.g., a beta testing session) to test functionality of one or more of the computing applications in question. Because the test data transmission is based on real payload data and real metadata from an actual data transmission, the test itself can be more reliable and more relevant to understanding how the computing applications actually operate in practice.

The target device 52 (or any remote components of the target device 52 if it consists of distributed hardware and software not all of which is local), the microservices 59, the database 48, and other components of the system 10 (FIG. 1) are interconnected via a network 234. The network 234 can be any suitable data network, such as the internet, a wide area network, a local area network, a wired network, a wireless network, a cellular network, a satellite network, a near field communication network, or any operatively connected combination of these.

Figure 5:
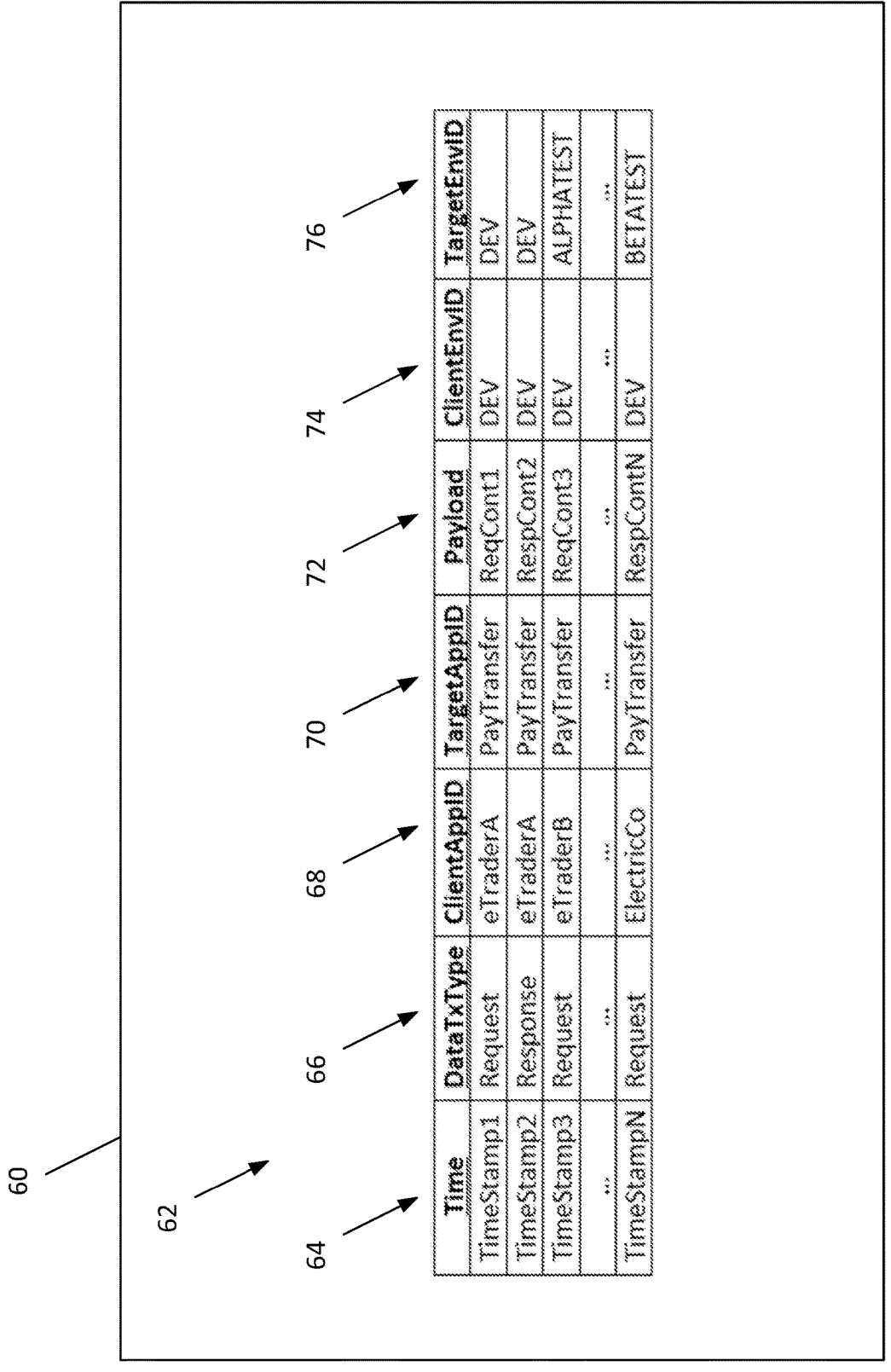
FIG. 5 illustrates a user interface generated by the system of FIG. 1.

FIG. 5 illustrates a user interface 60 generated by the system of FIG. 1.

The user interface 60 can be provided on the graphical display 58 (FIG. 4).

The user interface 60 includes a graphical display of a data transmission log 62. The information in the log 62 can correspond to the information in the stored log 50 of FIG. 4.

The log 62 is generated by the extraction tool 46 and the target computing application 16 of FIG. 4 and retrieved from the database 48 of FIG. 4.

The log 62 includes log entries. Each log entry is a horizontal row in the log 62. Each log entry corresponds to a data transmission (e.g., a request message or a response message) between a client computing device and a target computing device via an API gateway.

Each log entry consists of a time stamp 64, a data transmission type 66, a client computing application type 68, a target computing application type 70, a payload 72, a client environment indicator 74, and a target environment indicator 76.

For each log entry, the various data stored and displayed in the log 62 can be extracted from the payload and the header of the corresponding data transmission.

The log 62 serves as a map that maps individual data transmissions to specific computing environments, such as a mapping of a request 66 from a client computing application 68 to a target environment 76 of target computing application 70.

The arrangement of data in the log 62 is just one example of many possible organizations and arrangements of such data. In addition, the log can include additional data for data transmissions beyond those illustrated in FIG. 5.

The log 62 includes log entries 1, 2, 3 up to log entry N, where N is a positive integer greater than 3.

The first log entry in the log 62 corresponds to a data transmission that occurred at TimeStamp1. The data transmission is a request from eTraderA (a client computing application) operating in a development computing environment to PayTransfer (a target computing application) operating also in a development environment. The data transmission includes a payload that is a request for content from the target computing application.

The second log entry in the log 62 corresponds to a data transmission that occurred at TimeStamp2. The data transmission is a response from PayTransfer (a target computing application) operating in a development computing environment to eTraderA (a client computing application) and operating also in a development environment. The data transmission includes a payload that is a response to the request for content from the target computing application.

The third log entry in the log 62 corresponds to a data transmission that occurred at TimeStamp3. The data transmission is a request from eTraderB (another client computing application) operating in a development computing environment to PayTransfer (a target computing application) operating in an alpha testing environment. The data transmission includes a payload that is a request for other content from the target computing application.

The Nth log entry in the log 62 corresponds to a data transmission that occurred at TimeStampN. The data transmission is a request from ElectricCo (another client computing application) operating in a development computing environment to PayTransfer (a target computing application) operating in a beta testing environment. The data transmission includes a payload that is a request for yet other content from the target computing application.

In the context of the log 62 displayed on the user interface 60 of FIG. 5, the client computing applications eTraderA and eTraderB can be different customer facing computing applications for making trades or investments. For instance, eTraderA and eTraderB can be different user facing trading platforms put out by different trading companies. The client computing application ElectricCo can be a customer facing computing application for viewing and paying energy bills generated by an energy company.

The target computing application PayTransfer is a back-end computing application on which the client computing applications eTraderA, eTraderB and ElectricCo all depend. For example, eTraderA and eTraderB depend on PayTransfer to access a user's financial accounts in order to complete trades, investments, or other transactions facilitated by eTraderA and eTraderB. Similarly, ElectricCo depends on PayTransfer to access a user's checking account or savings account in order to pay energy bills. Thus, for example, the payloads ReqCont1. ReqCont3 and ReqContN can all be requests to access one or more financial accounts of a user that are managed by a financial institution that also operates at least components of the target computing application PayTransfer.

The payload RespCon2 can be a granting or denial of permission to access a financial account in response to the ReqCont1 payload.

As shown in the example log 62 of FIG. 5, the three different requests are routed to three different target computing environments. The data content of responses to the requests can depend on the target environment 76 that is associated with generating the response.

The application to environment mappings of the displayed log 62 can facilitate understanding discrepancies in responses to requests. For example, a discrepancy in a response may be a result of the target environment 76 that was associated with generating the response as opposed to being the result of a bug or defect in the client computing application or the target computing application. By knowing the computing environment to which a request or response was routed, troubleshooting and testing of the computing applications can be performed more efficiently.

Each log entry of the log 62 can also be used to generate a test data transmission to test behavior of a computing application with actual payload data and metadata extracted from a prior data transmission. In some examples, the test data transmission can processed in a test computing environment corresponding to the target computing environment identified in the corresponding log entry.

Figure 6:
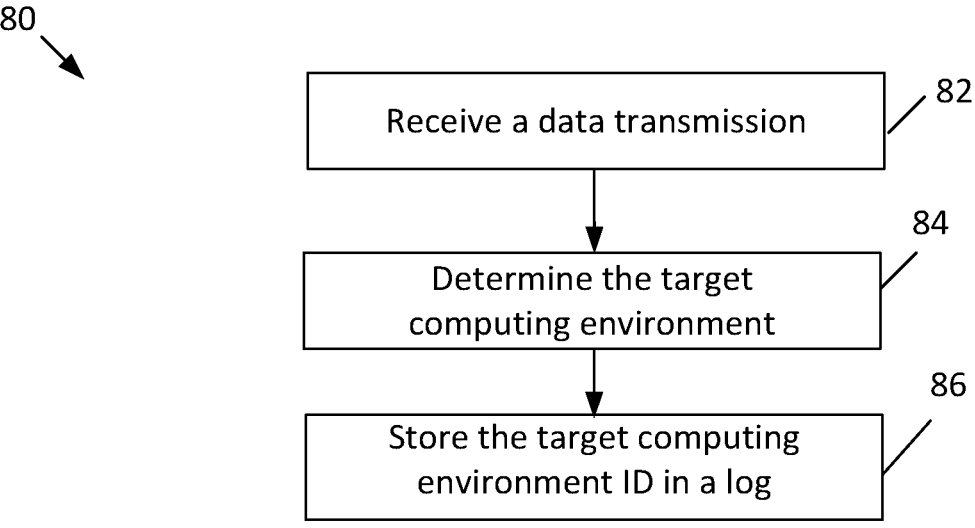
FIG. 6 illustrates a method of mapping a computing application to a computing environment using the system of FIG. 1 and the additional system components of FIG. 4.

FIG. 6 illustrates a method 80 of mapping a computing application to a computing environment using the system 10 of FIG. 1 and the additional system components of FIG. 4.

At a step 82 of the method 80, a data transmission is received. For example, the data transmission can be received by a target computing application.

At a step 84 of the method 80, the identification of a target computing environment is determined from the data transmission. For example, an extraction tool of the target computing application pulls metadata from a header of the data transmission to determine a target computing environment.

At a step 86 of the method 80, the determined identification of the target computing environment from the step 84 is stored as part of a log entry in a data transmission log.

Figure 7:
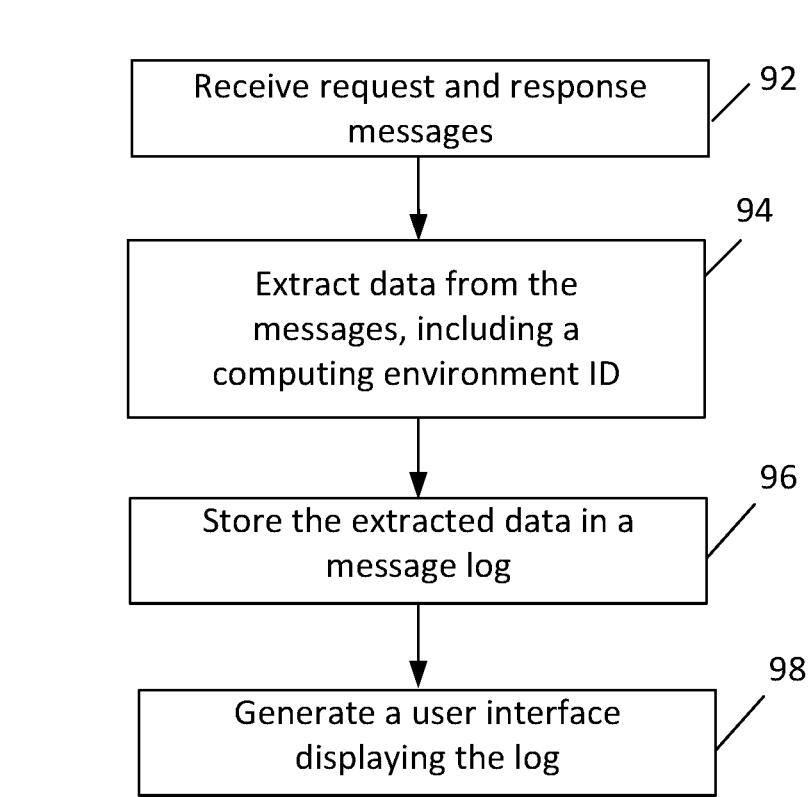
FIG. 7 illustrates another method of mapping a computing application to a computing environment using the system of FIG. 1 and the additional system components of FIG. 4.

FIG. 7 illustrates another method 90 of mapping a computing application to a computing environment using the system 10 of FIG. 1 and the additional system components of FIG. 4.

At a step 92 of the method 90, request and response messages between computing applications are received, e.g., by a target computing application.

At a step 94 of the method 90, the identification of a computing environment is extracted from the messages. For example, an extraction tool of the target computing application pulls metadata from a header of at least one of the messages to identify a target computing environment.

At a step 96 of the method 90, the extracted identification of the computing environment from the step 96 is stored as part of a log entry in a stored message log.

At a step 98 of the method 90, a user interface is generated that displays the stored message log.

Figure 8:
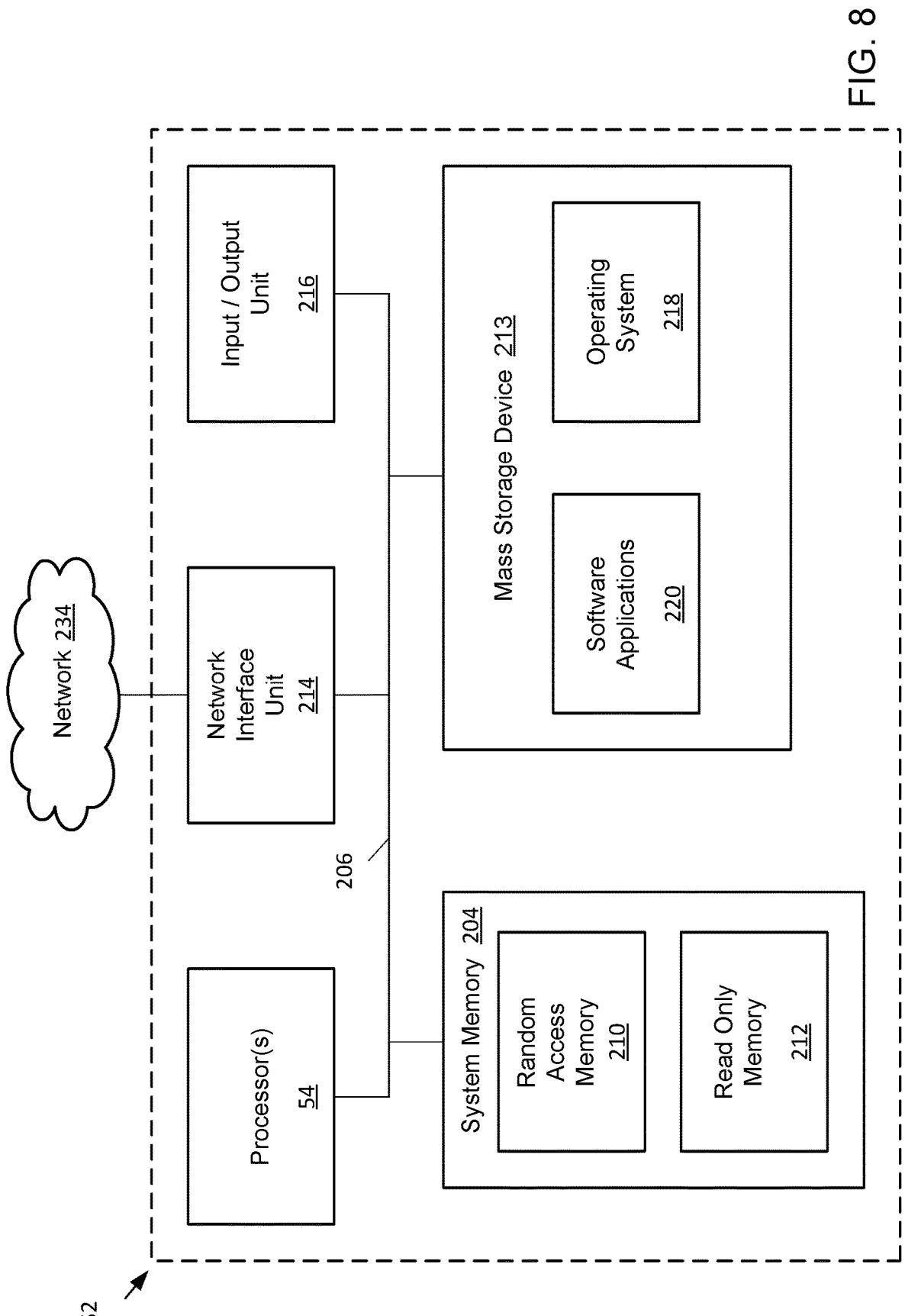
FIG. 8 illustrates example physical components of the system of FIG. 1 and additional system components of FIG. 4.

Additional components of the target device 52 are illustrated in FIG. 8. In this example, the target device 52 provides the computing resources to perform at least some of the functionality associated with the system 10 (FIG. 1) and the additional system components of FIG. 4. An end user device that downloads components of the client computing application 12 and other computing resources associated with the system 10 and the additional system components of FIG. 4 can be similarly configured.

The target device 52 can be an internally controlled and managed device (or multiple devices) of a business enterprise. Alternatively, the target device 52 can represent one or more devices operating in a shared computing system external to the enterprise, such as a cloud. Further, the other computing devices disclosed herein can include the same or similar components.

Via the network 234, any components of the target device 52 that are physically remote from one another can interact with one another, as well as with other computing resources, such as those shown in FIGS. 1 and 4.

The target device 52 includes the processor(s) 54, a system memory 204, and a system bus 206 that couples the system memory 204 to the processor(s) 54.

The system memory 204 includes a random access memory ("RAM") 210 and a read-only memory ("ROM") 212. A basic input/output system that contains the basic routines that help to transfer information between elements within the target device 52, such as during startup, is stored in the ROM 212.

The target device 52 further includes a mass storage device 213. The mass storage device 213 can correspond to the memory 55 (FIG. 4). The mass storage device 213 is able to store software instructions and data, such as components of the target computing application 16, test tool 57 and, in some examples, the extraction tool 46 (FIG. 4).

The mass storage device 213 is connected to the processor(s) 54 through a mass storage controller (not shown) connected to the system bus 206. The mass storage device 213 and its associated computer-readable data storage media provide non-volatile, non-transitory storage for the target device 52. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the target device 52.

According to various embodiments of the invention, the target device 52 may operate in a networked environment using logical connections to remote network devices (such as computing resources shown in FIGS. 1 and 4) through the network 234, such as a wireless network, the internet, or another type of network. The target device 52 may connect to the network 234 through a network interface unit 214 connected to the system bus 206. It should be appreciated that the network interface unit 214 may also be utilized to connect to other types of networks and remote computing systems. The target device 52 also includes an input/output unit 216 for receiving and processing input from a number of other devices, including a touch user interface display screen, an audio input device, or another type of input device. Similarly, the input/output unit 216 may provide output to a touch user interface display screen or other type of output device, including, for example, the I/O device 56 (FIG. 4).

As mentioned briefly above, the mass storage device 213 and/or the RAM 210 of the target device 52 can store software instructions and data. The software instructions include an operating system 218 suitable for controlling the operation of the target device 52. The mass storage device 213 and/or the RAM 210 also store software instructions and applications 220, that when executed by the processor(s) 54, cause the target device 52 to provide functionality of the system 10 and additional system components 45 described above (FIGS. 1 and 4).

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for mapping a client computing application to a computing environment, comprising:

receiving a data transmission between the client computing application and a target computing application, the target computing application operating across a plurality of computing environments;

determining, from the data transmission, that the data transmission was sent to the target computing application operating in a target computing environment of the plurality of computing environments;

storing, in a computer-readable storage, a log of the data transmission, the log including an indicator of the target computing environment; and determining, based on the indicator, whether a discrepancy in a response provided by the target computing application is caused by the target computing environment, the target computing application, or the client computing application, including:

(i) when the indicator is a first indicator, determining that the discrepancy is caused by the target computing environment, not caused by the target computing application, and not caused by the client computing application; and (ii) when the indicator is a second indicator different from the first indicator, determining that the discrepancy is caused by the target computing application or caused by the client computing application.

2. The method of claim 1, wherein the data transmission is associated with one of:

a request sent from the client computing application to the target computing application; or a response sent from the target computing application to the client computing application, the response being in response to a request sent by the client computing application to the target computing application.

3. The method of claim 1, wherein determining that the data transmission was sent to the target computing application is performed by the target computing application.

4. The method of claim 1, wherein the data transmission includes an identification of the target computing environment, the identification being added to the data transmission by an Application Programming Interface (API) gateway.

5. The method of claim 4, wherein the API gateway includes a proxy layer.

6. The method of claim 1, wherein the client computing application is a microservice application that uses a plurality of microservices.

7. The method of claim 1, wherein the plurality of computing environments includes a first testing environment and a second testing environment different from the first testing environment, the first testing environment and the second testing environment being configured to develop at least one of the client computing application and the target computing application.

13

14

8. The method of claim 7, wherein the target computing environment is either the first testing environment or the second testing environment.

9. The method of claim 1, further comprising generating, based on the log, a user interface that visually maps the client computing application and the data transmission to the target computing environment.

10. The method of claim 1, further comprising extracting, from the data transmission, a data payload.

11. The method of claim 10, further comprising:

generating a test data transmission for the client computing application based on the data payload; and processing the test data transmission in a test computing environment corresponding to the target computing environment.

12. The method of claim 1, wherein determining that the data transmission was sent to the target computing application includes extracting an identifier of the target computing environment from a header of a message corresponding to the data transmission.

13. The method of claim 12, wherein the message is a request sent from the client computing application to the target computing application or a response sent from the target computing application to the client computing application.

14. A system for mapping a client computing application to a computing environment, comprising:

at least one processor; and non-transitory computer-readable storage having stored thereon instructions which, when executed by the at least one processor, cause the at least one processor to:

receive a data transmission between the client computing application and a target computing application, the target computing application operating across a plurality of computing environments;

determine, from the data transmission, that the data transmission was sent to the target computing application operating in a target computing environment of the plurality of computing environments;

store a log of the data transmission, the log including an indicator of the target computing environment; and determine, based on the indicator, whether a discrepancy in a response provided by the target computing application is caused by the target computing environment, the target computing application, or the client computing application, including:

(i) when the indicator is a first indicator, determine that the discrepancy is caused by the target computing environment, not caused by the target computing application, and not caused by the client computing application; and (ii) when the indicator is a second indicator different from the first indicator, determine that the discrepancy is caused by the target computing application or caused by the client computing application.

15. The system of claim 14, wherein the plurality of computing environments includes a first testing environment and a second testing environment different from the first testing environment, the first testing environment and the second testing environment being configured to develop at least one of the client computing application and the target computing application; and wherein the target computing environment is either the first testing environment or the second testing environment.

16. The system of claim 14, wherein the instructions, when executed by the at least one processor, further cause the at least one processor to generate, based on the log, a user interface that visually maps the client computing application and the data transmission to the target computing environment.

17. The system of claim 14, wherein the instructions, when executed by the at least one processor, further cause the at least one processor to:

extract, from the data transmission, a data payload;

generate a test data transmission for the client computing application based on the data payload; and process the test data transmission in a test computing environment corresponding to the target computing environment.

18. The system of claim 14, wherein the data transmission sent to the target computing application operating in a target environment of the plurality of computing environments is determined by extracting an identifier of the target computing environment from a header of a message corresponding to the data transmission.

19. The system of claim 18, wherein the message is a request sent from the client computing application to the target computing application or a response sent from the target computing application to the client computing application.

20. A method for mapping a client computing application to a computing environment, comprising:

receiving messages, the messages including:

a request message, sent by the client computing application via an Application Programming Interface (API) gateway to a target computing application; and a response message, in response to the request message, sent by the target computing application via the API gateway to the client computing application;

extracting data from each message of the messages, the data including:

a data transmission type indicator indicating whether the message is a request message or a response message;

a client computing application identifier identifying the client computing application;

a target computing application identifier identifying the target computing application;

a payload;

a first computing environment identifier identifying a client computing environment in which the client computing application was operating when processing the message; and a second computing environment identifier identifying a target computing environment in which the target computing application was operating when processing the message;

logging the data to generate logged data;

generating a user interface that displays a log of the logged data; and determining, based on a discrepancy indicator, the discrepancy indicator including at least one of the data transmission type identifier, the client computing application identifier, the target computing application identifier, the first computing environment identifier, and the second computing environment identifier, whether a discrepancy in the response message is caused by the target computing environment, the target computing application, or the client computing application, including:

(i) when the discrepancy indicator is a first indicator, determining that the discrepancy is caused by the target computing environment, not caused by the target computing application, and not caused by the client computing application; and (ii) when the discrepancy indicator is a second indicator different from the first indicator, determining that the discrepancy is caused by the target computing application or caused by the client computing application.

* * * * *